March 7, 1933.  F. W. WEIR  1,900,376

APPARATUS FOR WELDING TUBES

Original Filed July 14, 1931   3 Sheets-Sheet 1

INVENTOR
Fred W Weir
by F. N. Barber
attorney

March 7, 1933.  F. W. WEIR  1,900,376
APPARATUS FOR WELDING TUBES
Original Filed July 14, 1931  3 Sheets-Sheet 2

INVENTOR
Fred W. Weir
by F. N. Barber
Attorney

March 7, 1933. F. W. WEIR 1,900,376
APPARATUS FOR WELDING TUBES
Original Filed July 14, 1931 3 Sheets-Sheet 3
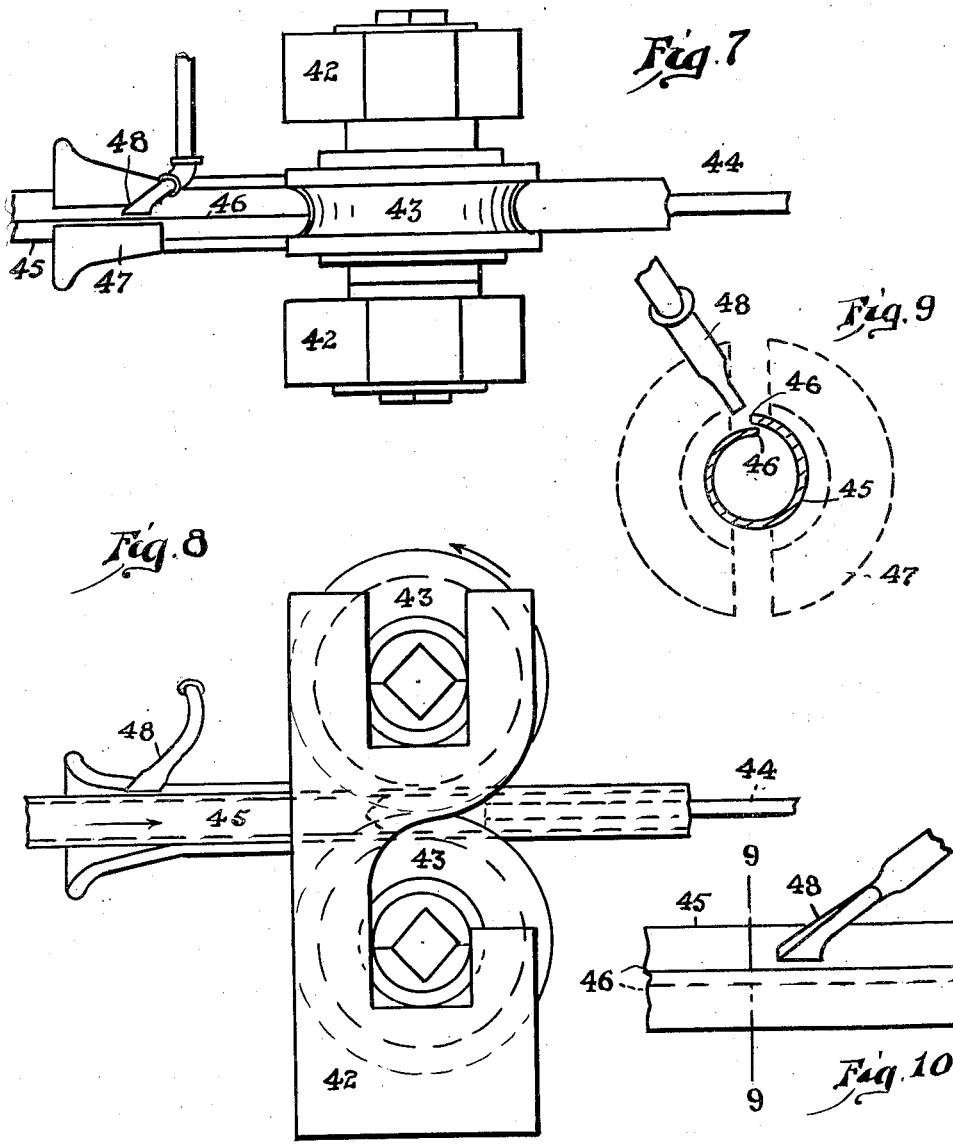
INVENTOR
Fred W. Weir
by F. N. Barber
Attorney Patented Mar. 7, 1933

1,900,376

UNITED STATES PATENT OFFICE

FRED W. WEIR, OF PITTSBURGH, PENNSYLVANIA

APPARATUS FOR WELDING TUBES

Original application filed July 14, 1931, Serial No. 550,657. Divided and this application filed January 9, 1932. Serial No. 585,720.

My invention relates to apparatus for welding. One of its principal objects is to raise the temperature of the edges or surfaces to be welded together to a higher temperature than the edges or surfaces are usually heated preliminarily to the seam-closing steps of welding operations. Another object is to prepare the said edges or surfaces prior to the seam-closing steps so as to ensure that the welded edges or surfaces shall be freed from oxides, scale, and other foreign matter. A further object is to remove scale or other foreign matter from one or both surfaces of objects as they are being welded. Other objects appear hereinafter.

This application is a division of my application Serial Number 550,657, filed July 14, 1931.

Figure 1:
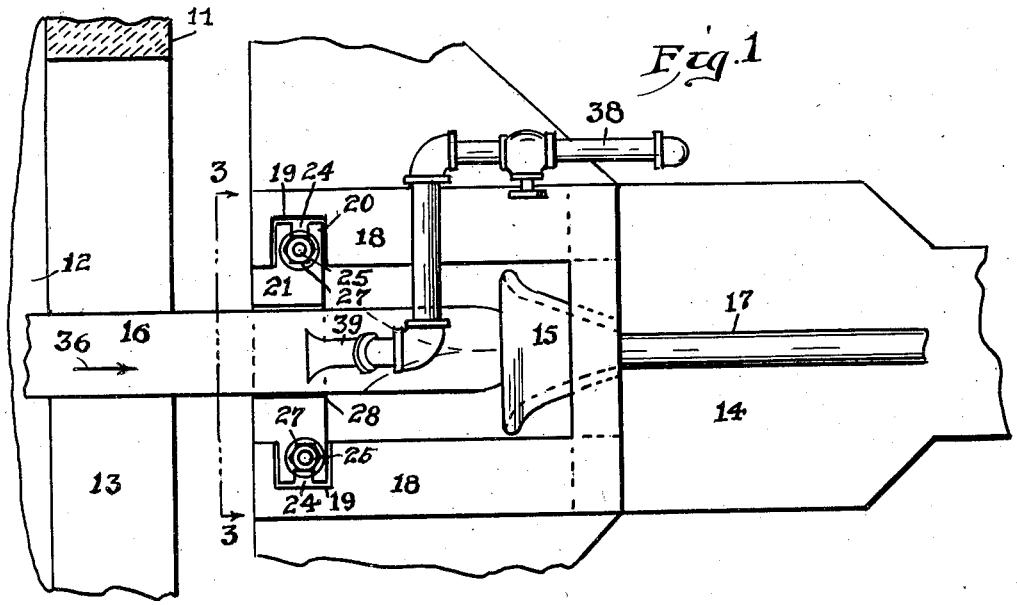
Figure 2:
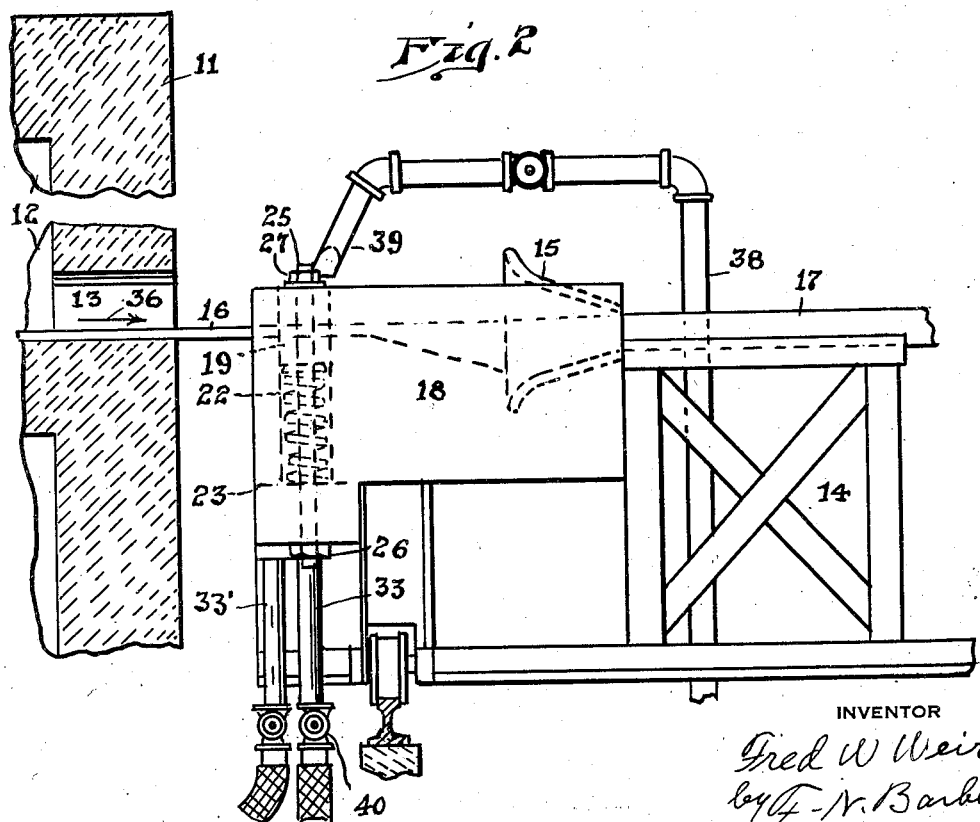
Figure 3:
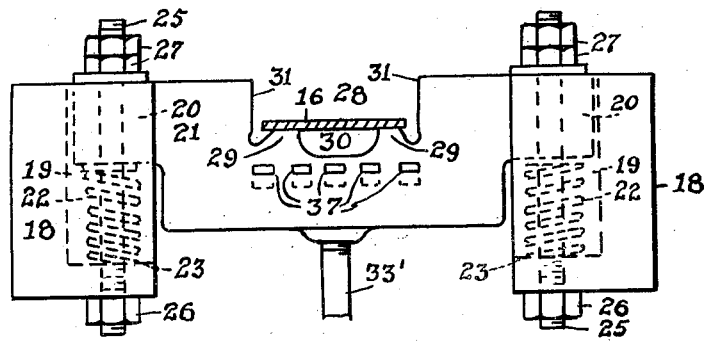
Figure 4:
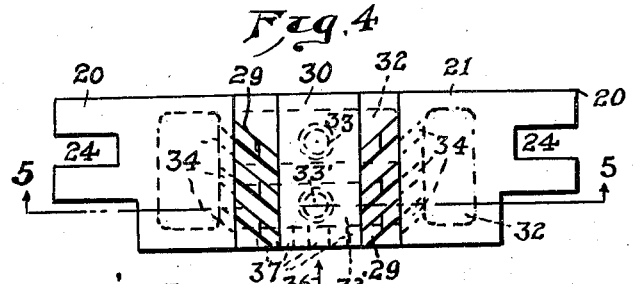
Figure 5:
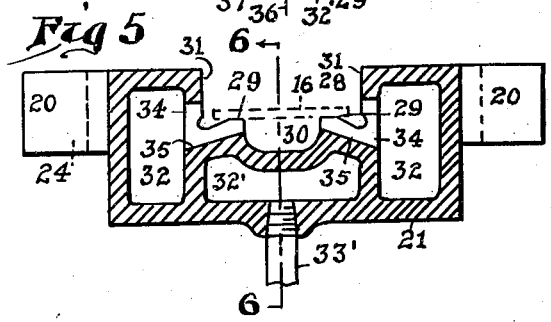
Figure 6:
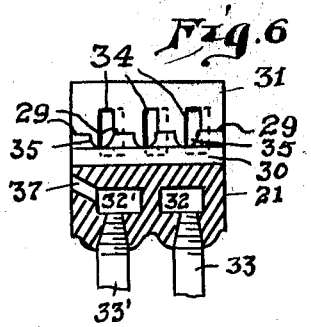

Referring to the accompanying drawings, Fig. 1 is a plan view of fragments of a furnace and a butt-welding draw-bench associated with one form of my invention, parts being broken away and omitted; Fig. 2, a side view of Fig. 1, but showing the furnace in vertical longitudinal section; Fig. 3, an end elevation of one form of a blower head for directing pre-heated gas into contact with the said skelp just prior to the seam-closing step; Fig. 4, a plan view of Fig. 3 without the lateral supports for the head; Fig. 5, a section on the line 5—5 on Fig. 4; Fig. 6, a section on the line 6—6 on Fig. 5; Fig. 7, a plan view illustrating my invention as applied to the making of lap-welded tubes, many parts being omitted; Fig. 8, a side view of Fig. 7; Fig. 9, an enlarged cross-section of the pipe 45, the section being taken at the left of the bell 47 in Fig. 7, the bell being indicated by dotted lines, and Fig. 10, an enlarged plan view showing the relative arrangement of the skelp being welded and the nozzle of the blower.

While my invention may be illustrated as applied to the securing together of the adjacent edges or surfaces of the seam or different objects irrespective of the shapes or cross-sections of the objects, I have elected to illustrate the same as applied to the manufacture of butt-welded and lap-welded tubes.

Referring first to Figs. 1 to 6, 11 designates a front end wall of a skelp-heating furnace 12 having the skelp-discharge opening 13.

14 designates the portion of a draw-bench adjacent to the wall 11 of the furnace. The draw-bench is provided with the welding-bell 15 through which the skelp, one being shown at 16, is withdrawn from the furnace and formed into a butt-welded tube, a portion of which is indicated at 17 at the right of the bell. The apparatus thus far described is old and well known and need not be further described.

The draw-bench carries the two parallel head-blocks 18 arranged at right angles with the furnace wall 11 and spaced apart so that the welding bell lies between them. The head-blocks have the opposed vertical recesses 19 in which the ends 20 of the blower-head 21 have limited vertical travel. The ends 20 rest on the vertical springs 22 seated on the bottom wall 23 of the recesses. The ends 20 have openings 24 in which vertical bolts 25 stand, the bolts standing also in the bottom walls 23 to which they are secured by the nuts 26. The nuts 27 are screwed on the upper ends of the bolts 25 to limit the upward movement of the blower-head.

The upper face of the blower-head has a transversely upwardly-open channel 28 through which the skelp 16 travels, the vertical sides 31 of the channel constituting guides for edges of the skelp. The lower face of the skelp rides on the upper surfaces of two series of ribs 29 at the bottom of the channel 28 and adjacent to the sides 31 thereof, the two series of ribs being separated by the upwardly-open passage 30 below the skelp 16. The upper edges of these ribs 29 are inclined downwardly and toward the adjacent sides 31 so as not to engage the lower face of the skelp adjacent to its edges.

The blower-head 21 contains a chamber 32 provided in its lower wall with the inlet pipe 33 for pre-heated fluid, such as air, for example. There are a number of outlet ports 34 in the sides 31 through which the pre-heated fluid is directed into the channel 28 and against the edges of the skelp 16 therein. The ports 34 are vertically elongated sufficiently to direct the fluid against the upper and lower faces of the skelp as well as against its edges. The channels 35 between the ribs 29 conduct some of the fluid beneath the skelp and into the upwardly-open passage 30 lying transversly of the blower-head and in the bottom of the channel 28. The passage 30 lies between the opposing inner ends of the ribs 29. The ribs 29 and consequently the channels 35 are inclined so as to direct the heated fluid toward the direction from which the skelp is moving, the normal direction of movement of the skelp being indicated on Figs. 1, 2, and 4 by the arrow 36.

If desired, the blower-head 21 may have a separate channel 32' provided with outlet ports 37 at the side thereof toward the furnace to direct a selected fluid, such as superheated steam, against the lower face of the skelp 16 before it reaches the welding-bell 15. The pipe 33' conducts the steam to the chamber 32'. The ports 37 are inclined so as to direct the fluid diagonally against the skelp and to blow any scale or other foreign matter on the lower edge of the skelp toward the furnace or away from the bell. On Figs. 1 and 2, 38 designates a pipe for conveying superheated steam to the nozzle 39 which opens directly above the upper face of the skelp just before it reaches the bell 15, the nozzle being inclined downwardly and toward the furnace or the direction from which the skelp is moving so as to blow any scale or the like toward the furnace or so that it will not enter the bell with the skelp.

In the practice of this invention with the butt-welding apparatus, the skelp are heated and drawn in the usual well known or other manner, the flat skelp 16 being drawn one by one from the furnace through the welding-bell by which the skelp is caused to take a tubular form and the heated edges thereof are pressed together to form a welded seam from one end of the resultant tube to the other. Simultaneously with the drawing operation superheated air under pressure is admitted to the chamber 32 and impinges against the edges of the skelp and the upper and lower faces thereof, more particularly, those parts of the faces adjacent to the edges of the skelp.

The gaseous fluid blown against the skelp from the blower-head is air which contains approximately 23% oxygen, the remainder being principally nitrogen. As the blast of pre-heated air strikes the heated edges of the skelp during welding operations, the oxygen because of its great affinity for carbon and manganese contained in the skelp has a tendency to unite therewith to support combustion which results in a localized increase in temperature. To a degree, the inert or non-reactive constituent of the air, nitrogen, has a tendency to reduce temperatures as it consumes heat from the skelp, particularly in cases where the blast is at approximately atmospheric temperatures. Not only is it desirable to maintain a welding temperature or actually increase the temperature at the weld, but also it is desirable to direct a blast of considerable intensity in order to render more efficient the scavenging effect of the same. It is also desirable to control, as by the valve 40 in the pipe 33 or by any other efficient means, the amount of oxygen directed to the edges of the skelp to be welded in order to reduce the decarburizing effect resulting from combustion because the carbon and manganese constitutents of the metal have a marked influence on the strength of the finished product. By increasing the intensity of the blast at atmospheric temperature, it has been observed that the increased volume of nitrogen has a chilling effect which led to the development of this invention wherein the air is required to be pre-heated to a relatively high temperature in order to offset the neutralizing effect of the nitrogen and at the same time intensify the blast without introducing an excess of oxygen. The heating of the air to a high temperature reduces its density and causes less oxygen to impinge against the skelp, other conditions remaining unchanged.

The combustion of oxygen and carbon and also oxygen and manganese tends to raise the temperature at the weld to a sufficiently high degree for welding so that the heating furnace for the skelp may be operated at a slightly lower temperature. By pre-heating the air to a high temperature the deterimental chilling effect of the nitrogen constituent in the air is practically eliminated because under these conditions it will draw little or no heat from the skelp.

Referring now to Figs. 7 to 10, I have shown a pair of housings 42 in which the two welding or closing rolls 43 are journalled. 44 designates the usual mandrel positioned in the roll-pass and over which the tubular skelp 45 is passed while the heated lips 46 of the tubular skelp are pressed together between the rolls on the outside of the skelp and the mandrel on the inner side thereof so as to form a welded seam on the upper side of the tube. As the skelp 45 passes through the guide bell 47 on its way to and through the rolls 43, a stream of pre-heated air under pressure is directed against the lips or edges 46 of the skelp. This air is directed to the said edges by the nozzle 48 arranged at such an angle as to direct the air into the space between the edges and against the same and also against the advancing movement of the skelp which travels as indicated by the arrow thereon. The function of the pre-heated air is the same in the lap-welding process as in the butt-welding process hereinbefore described.

I claim:—

1. In an apparatus for welding together the heated edges of a metalic strip, a blower-head having a channel through which the strip is fed, lateral ports in the head opposite the edges of the strip, a chamber in the blower-head with which the ports communicate, and means to supply highly heated air under pressure to the chamber, the bottom of the channel having transverse ribs on which the strip rests, there being transverse passages between the ribs to conduct the said air from the ports into contact with the lower face of the strip near its edges.

2. In an apparatus for welding together the heated edges of a metallic strip to form tubes, a blower-head having a channel through which the strip is fed, lateral ports in the head opposite the edges of the strip, a chamber in the blower-head with which the ports communicate, and means to supply highly heated air under pressure to the chamber, the bottom of the channel having transverse ribs on which the strip rests, there being transverse passages between the ribs to conduct the said air from the ports into contact with the lower face of the strip near its edges, the outer ends of the ribs being spaced below the edges of the strip.

3. In an apparatus for welding together the heated edges of a metallic strip to form tubes, a blower-head having a channel through which the strip is fed, lateral ports in the head opposite the edges of the strip, a chamber in the blower-head with which the ports communicate, and means to supply highly heated air under pressure to the chamber, the bottom of the channel having transverse ribs on which the strip rests, there being transverse passages between the ribs to conduct the said air from the ports into contact with the lower face of the strip near its edges and the ribs being inclined horizontally to direct the air blast away from the seam-closing instrumentality.

In testimony whereof, I hereunto affix my signature.

FRED W. WEIR.